United States Patent
Guerra et al.

(10) Patent No.: US 11,962,556 B2
(45) Date of Patent: Apr. 16, 2024

(54) ANIMATED NOTIFICATION INDICATOR

(71) Applicant: Microsoft Technology Licensing, LLC, Redmond, WA (US)

(72) Inventors: Taylor Alexis Guerra, Seattle, WA (US); Kyle Matthew Miller, Lynnwood, WA (US); Hariharan Ragunathan, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/854,658

(22) Filed: Jun. 30, 2022

(65) Prior Publication Data

US 2024/0007428 A1   Jan. 4, 2024

(51) Int. Cl.
*H04L 51/224* (2022.01)
*G06F 3/04817* (2022.01)
*G06F 3/0482* (2013.01)

(52) U.S. Cl.
CPC ........ *H04L 51/224* (2022.05); *G06F 3/04817* (2013.01); *G06F 3/0482* (2013.01)

(58) Field of Classification Search
CPC ... H04L 51/224; G06F 3/04817; G06F 3/0482
See application file for complete search history.

(56) References Cited

U.S. PATENT DOCUMENTS

| | | | |
|---|---|---|---|
| 2007/0045433 A1* | 3/2007 | Chapman | G05D 23/1902 236/46 R |
| 2017/0315701 A1* | 11/2017 | Rolih | G06F 3/04883 |
| 2021/0223953 A1* | 7/2021 | Cinek | G06F 3/0482 |
| 2021/0240332 A1* | 8/2021 | Walkin | G06F 3/0485 |
| 2023/0055241 A1* | 2/2023 | Zionpour | G06F 40/166 |

\* cited by examiner

*Primary Examiner* — Cao H Nguyen

(57) ABSTRACT

Aspects of the present disclosure relate to an animated notification indicator, which may be used to provide an indication of a notification. The animated notification indicator may be less distracting than displaying the notification itself, while, compared to a static indicator, the animated notification indicator may have a higher likelihood of catching the user's attention. The indicator may be animated for a predetermined amount of time, after which it may transition to a static indicator. Interaction with the indicator may display an associated notification, perform an associated action, or present a notification preview and/or set of quick actions, among other examples. In some instances, a context associated with the user's computing device may be processed by a notification platform, and the notification may thus be determined remotely. As a result, the animated notification indicator may be presented at the user's computing device as a result of such a remote determination.

20 Claims, 13 Drawing Sheets

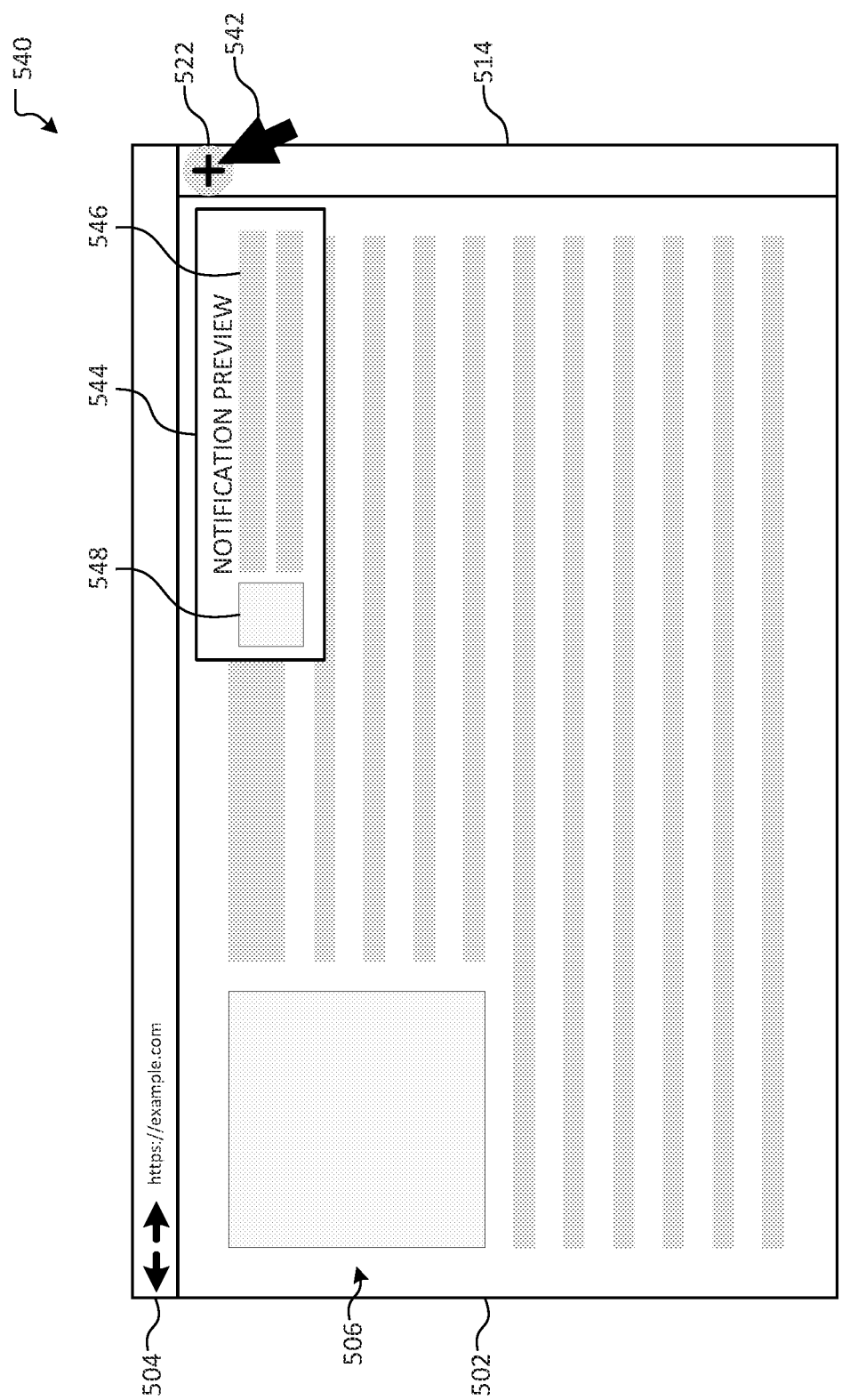

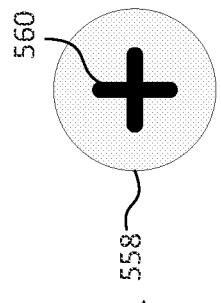
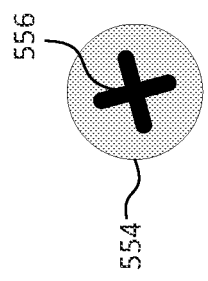
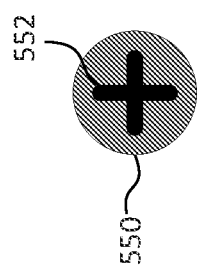
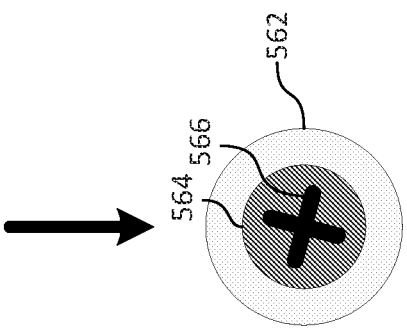
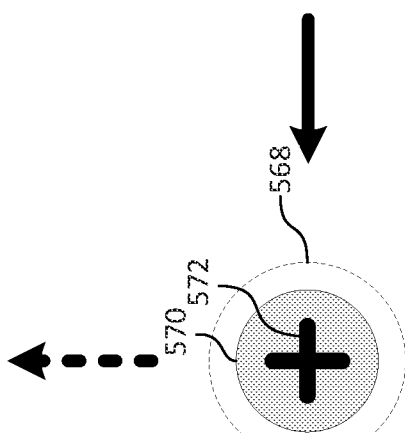
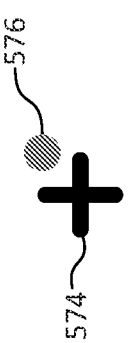

ANIMATED NOTIFICATION INDICATOR

BACKGROUND

In certain instances, a user may find a notification annoying, while merely adding a badge or other static indicator may fail to capture the user's attention. Thus, it may be beneficial to have an intermediate mechanism for providing an indication to a user that is more visually engaging than a static indicator but less distracting than a notification.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to an animated notification indicator, which may be used to provide an indication of a notification. As compared to displaying the notification to a user, the animated notification indicator may be less distracting to the user. Similarly, as compared to a static indicator, the animated notification indicator may have a higher likelihood of catching the user's attention, such that the user may become aware of an associated notification, which may be contextually and/or temporally relevant. The indicator may be animated for a predetermined amount of time, after which it may transition to a static indicator. Interaction with the indicator may display an associated notification, perform an associated action, or present a notification preview and/or set of quick actions, among other examples. In some examples, a context associated with the user's computing device may be processed by a notification platform, and the notification may thus be determined remotely from the computing device. As a result, the animated notification indicator may be presented at the user's computing device as a result of such a remote determination.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 5A-5D illustrate overviews of example user interface aspects with which an animated notification indicator may be presented to a user according to aspects described herein.

FIGS. 5E-5J illustrate overviews of an example animation for an animated notification indicator according to aspects described herein.

DETAILED DESCRIPTION

Figure 1:
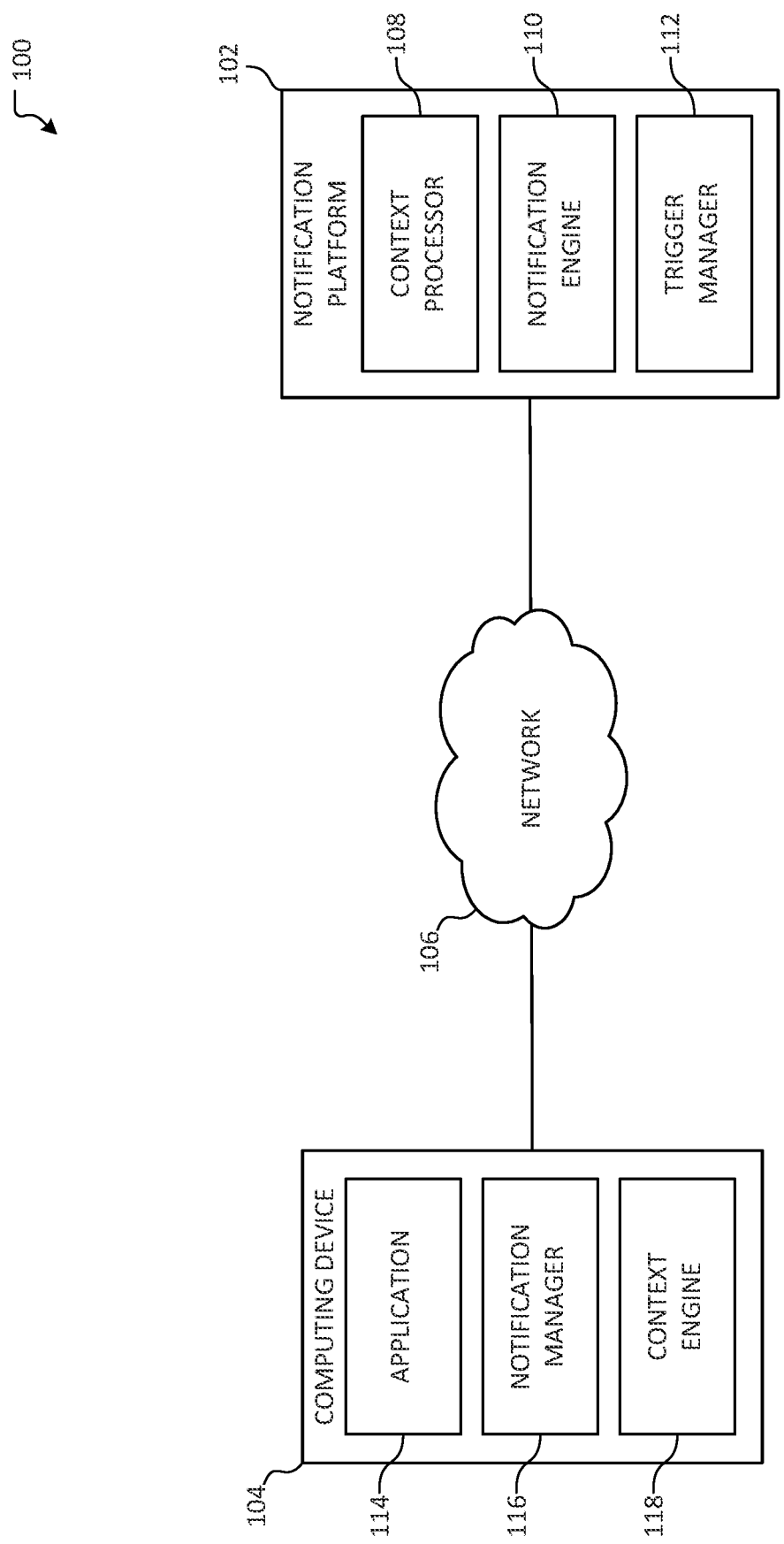
FIG. 1 illustrates an overview of an example system in which an animated notification indicator may be used according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, it may be determined to generate a notification for a user (e.g., as a push notification or based on a contextual trigger). However, displaying the notification to the user may distract the user from a task at hand, while displaying a static indicator associated with the notification (e.g., merely adding a badge to an icon or incrementing a number of notifications awaiting the user's attention) may fail to catch the user's attention. As a result, the user may become frustrated or may fail to become aware of the notification, which may be especially detrimental in instances where the notification is temporally and/or contextually relevant.

Accordingly, aspects of the present disclosure relate to an animated notification indicator. In examples, the disclosed animated notification indicator may be used to draw attention to an application icon, an extension icon (e.g., of an application), a service icon (e.g., associated with a website or platform), or any of a variety of other icons or user interface (UI) elements associated with a notification. In some instances, the indicator may be animated for a predetermined period of time (also referred to herein as a "timeout period" associated with a "timeout timer"), after which the indicator may transition to a static indicator (e.g., as a result of pausing or ending the associated animation or displaying a different indicator). In other instances, the indicator may transition between static and animated states (e.g., where the animated notification indicator is presented for a first period of time and a static indicator is presented is presented for a second, intervening, period of time), or may remain animated, until user interaction associated with the indicator is received. Example user interactions include, but are not limited to, mouse, keyboard, touch, and/or physical control input by a user.

As a further example, a static indicator may become animated or may otherwise transition to an animated notification indicator to indicate that a new notification has been generated or to indicate that the notification has increased in temporal and/or contextual relevance, among other examples. Similarly, the animated notification indicator may transition to a display of the notification with which it is associated, or vice versa, in other examples. Thus, it will be appreciated that an animated notification indicator may be used as part of a progression (e.g., starting from a static indicator or ending in a static indicator) or may be used separate from other notification mechanisms, among other examples.

An animated notification indicator as described herein may have one or more associated actions that are performed in response to a user interaction. For example, if a user actuates the indicator (e.g., as a right click or by tapping on the indicator), a notification associated with the indicator may be displayed to the user. As another example, user actuation of the indicator may cause an action associated with the notification to be performed, such as opening an application or a website, among other examples. In some instances, a set of quick actions or a preview of the associated notification may be presented to the user when a hover, mouseover, or other similar user interaction is received in association with the indicator. The preview or set of quick actions may be presented after the mouseover or similar event has occurred for a predetermined amount of time. In a further example, a user may provide an alternate actuation of the indicator (e.g., a right click or a double tap) that snoozes or dismisses the indicator. In some instances, animation of the animated notification indicator may be stopped in response to such user interactions.

In examples, there may be a set of multiple notifications for which an animated notification indicator would be presented (e.g., as a result of receiving multiple push notifications, as a result of determining to generate multiple contextually and/or temporally relevant notifications, or a combination thereof). Accordingly, the set of notifications may be processed to determine which notification of the set of notifications should be presented using an animated notification indicator (which may be referred to herein as "arbitration" or an "arbitration process").

In examples, each notification may have an associated priority level (e.g., as may be defined by a software developer or service, or as may be determined based on the content of the notification), such that the arbitration process identifies the notification having the highest priority to be presented using an associated animated notification indicator. As another example, a recency with which a previous notification was presented may be evaluated, such that an application, extension, or service that has not recently generated a notification may be prioritized over an application, extension, or service for which a notification and/or associated indicator was more recently presented. It will thus be appreciated that any of a variety of techniques may be used to evaluate a set of notifications to determine which notification will be presented using an animated notification indicator according to aspects described herein. The other notifications of the set of notifications may be presented using a static indicator (e.g., thus being "downgraded" from the animated notification indicator) and/or using any of a variety of other notification mechanisms.

A notification according to aspects described herein may be generated based on any of a variety of events. For example, a trigger may cause a notification to be generated for a given context, thereby causing a notification to be presented to the user that is temporally and/or contextually relevant to the user's current context. As an example, a context may include, but is not limited to, content that is presented to a user (e.g., textual, video, audio, and/or graphical content of a website or of a document), a location from which the content was obtained (e.g., a website uniform resource locator (URL), a document path, or a shared drive), a location at which the computing device is located (e.g., whether the computing device is in an office or at home), a behavior of a user (e.g., detected or repeated actuation of a set of UI and/or hardware controls), and/or session information associated with the user's computing device, among other examples.

As an example, the trigger may have an associated a set of rules that are used to process the context to determine whether to generate the notification. As another example, processing a trigger may comprise extracting one or more entities (e.g., keywords, images, titles, and/or a URL or other path) associated with the user's context, which may be further processed to determine whether to generate the notification. In some instances, the processing associated with a trigger may further comprise generating the content of the notification (e.g., comprising text, an image, a video, and/or audio), which, in some examples, may be generated based at least in part on the context and/or extracted entities.

As another example, a context may be processed once a webpage has been loaded in a web browser application, such that a notification may be triggered based on the webpage accordingly. In some examples, the user's computing device may determine that the website is one for which a set of triggers are available, such that the computing device provides an indication of the user's context to a server computing device (as may be part of a notification platform). The server computing device may process the user's context (e.g., according to a set of rules and/or using entity extraction) to generate a notification, which may be provided to the user's computing device for presentation to the user accordingly.

For example, a user may access a travel website using the web browser application, which may have a set of associated triggers. Context information associated with the user's context may be provided to the notification platform, which may process the context information to generate a temporally relevant notification for the user. The notification may comprise a weather forecast or other travel information associated with a location to which the user is considering traveling (as indicated by the loaded webpage). The notification may then be provided to the user's computing device, thereby causing the user's computing device to present the notification to the user according to aspects described herein. For example, an animated notification indicator may be presented in association with an application icon, extension icon, service icon, or other icon from which the weather forecast or other travel information was obtained. The user may actuate the icon to view the notification and, thus, the additional information that was determined based on the trigger.

In another example, a notification may be generated when a user is redirected from one application, extension, service, or website to another application, extension, service, or website, among other examples. For example, if a user is redirected from an application to a website, a notification may be generated to indicate to the user that the web browser application has been opened as a result of a user interaction in the application from which the user was redirected, thereby improving continuity in such scenarios.

As a further example, a notification may be generated based on an indication that is received by the user's computing device, as may be the case when the device receives a push notification (e.g., from the notification platform or from a third-party application or service). Thus, it will be appreciated that aspects described herein may provide a central framework with which to present notifications, thereby offering a consistent user experience within an application, among a group of applications, and/or throughout an operating system, among other examples.

Thus, the user's computing device may make an initial determination as to whether a trigger is available based on the user's context, such that the server computing device may make a subsequent determination whether a notification is triggered and the notification is generated and provided to the user's computing device for presentation. As a result of performing aspects of the notification trigger processing at the notification platform, it may be possible to update notifications and associated contexts more quickly than if notification processing was instead performed primarily at the user's computing device. Even so, it will be appreciated that, in other examples, such processing may be performed substantially or entirely locally to the user's computing device rather than by the notification platform, or vice versa.

An animated notification indicator may be used to indicate a notification associated with an extension of a browser application executing on a computing device in some examples. For instance, the browser may include a frame in which controls are provided (e.g., a back UI control, a forward UI control, and a field in which a uniform resource locator (URL) or other address may be entered and/or displayed) and a viewport in which content is presented (e.g., a website of a webpage). The browser frame may further include a set of extension icons, each of which may be associated with a first-party or a third-party extension, among other examples. In some instances, one or more extension icons may be accessible via a submenu, such that an animated notification indicator may be presented in association with an icon or other UI element of the submenu to indicate a notification for the submenu extension icon according to aspects described herein.

If a trigger associated with an extension determines to generate a notification, an animated notification indicator may be used to indicate the notification accordingly. The animated notification indicator may include animating the extension icon itself and/or displaying an animated notification indicator in association with the extension icon, examples of which are discussed in greater detail below with respect to FIGS. 5A-5J. As noted above, the determination to generate the notification may be performed server-side, such that a determination remote from the computing device causes display of the animated notification indicator in a frame (as compared to a viewport) of the browser application.

It will be appreciated that the timeout threshold, indicator animation (e.g., frequency and/or style), and associated actions that are performed in response to various user interactions, among various other aspects of the disclosed animated notification indicator, may be user-configurable, remotely configurable, and/or may vary based on an associated context.

FIG. 1 illustrates an overview of an example system 100 in which an animated notification indicator may be used according to aspects described herein. As illustrated, system 100 includes notification platform 102, computing device 104, and network 106. Notification platform 102 and computing device 104 are illustrated as communicating via network 106, which may comprise a local area network, a wireless network, or the Internet, or any combination thereof, among other examples.

Computing device 104 may be any of a variety of devices, including, but not limited to, a mobile computing device, a tablet computing device, a laptop computing device, a desktop computing device, a server computing device, or an IoT computing device. As illustrated, computing device 104 includes application 114, notification manager 116, and context engine 118. Application 114 may be any of a variety of software that executes on computing device 104, including first-party software (e.g., as may be part of or provided with an operating system of computing device 104) and third-party software, among other examples.

As an example, application 114 may be a productivity application (e.g., a word processing application, a presentation application, and/or a spreadsheet application) or a web browser application. Application 114 may include one or more plugins, add-ons, or extensions that further extend the capabilities of application 114 (e.g., as may be provided by the developer of application 114 and/or by one or more third-parties). While examples are described with respect to application 114, it will be appreciated that similar notification techniques may be applied by an operating system or other piece of software executing on computing device 104 in other examples.

Notification manager 116 may manage the generation and presentation of notifications and associated indicators according to aspects described herein. Context engine 118 may maintain a context for computing device 104, which may include information associated with application 114 (e.g., content that is displayed by application 114, such as a webpage or website that is accessed by application 114). The context may additionally or alternatively include information associated with computing device 104, such as a geographical location of the computing device or a location at which the computing device is being used (e.g., whether the device is at work or at home). It will be appreciated that the context may include any of a variety of additional or alternative information according to aspects described herein.

Notification manager 116 may determine that the context managed by context engine 118 has one or more associated triggers. For example, notification manager 116 may make such a determination based on trigger information provided by notification platform 102. The trigger information may include a list of websites, applications, and/or services for which one or more triggers are available or may include a regular expression, pattern, or other information that may be used for matching, among other examples. If notification manager 116 determines there is a trigger associated with the context of computing device 104, notification manager 116 may provide context information to notification platform 102 accordingly.

As illustrated, notification platform 102 includes context processor 108, notification engine 110, and trigger manager 112. In examples, context processor 108 processes context information, as may be received from computing device 104. As discussed above, context processor 108 may process context information received from a computing device according to one or more triggers (e.g., which may have an associated set of rules and/or may comprise performing entity extraction). For example, a trigger may be identified for a given context based on an association with an application, extension, service, URL, or path indicated by the context information, among other examples.

As such, if context processor 108 determines to generate a notification, notification engine 110 may process the context information based on the trigger to generate the notification accordingly. In examples, notification engine 110 generates the notification based on content indicated by the context information, based on content indicated by the trigger, and/or based on content from any of a variety of other data sources (not pictured). Returning to the above example for a travel website, notification engine 110 may obtain weather data from a remote data source, which may be included in the notification in combination with content from the context information. Notification engine 110 may then provide the generated notification to computing device 104 for display to a user. In examples, the notification is provided in association with a priority level, which may be used for arbitration as described above.

Notification manager 116 thus receives the notification from notification engine 110, such that notification manager 116 may use an animated notification indicator to provide an indication of the notification to the user according to aspects described herein. In some examples, notification manager 116 may determine how and/or whether to display the notification to the user. For example, notification manager 116 may perform notification arbitration in instances where multiple notifications are received substantially contemporaneously. As another example, notification manager 116 may determine whether the notification should be indicated using a static indicator or an animated notification indicator, or whether the notification itself should be presented to the user. Notification manager 116 may similarly transition between a static indicator, an animated indicator, and/or a notification, in any of a variety of orders, as discussed above. In a further example, notification manager 116 may determine not to display the notification (or an indicator associated therewith) if the context has changed, if the user has already received another notification within a predetermined amount of time, or if the user has snoozed such notifications or indications, among other examples.

In examples, the animated notification indicator is displayed in association with an application icon, extension icon, service icon, website icon, or other icon for which the notification was generated. For example, if the notification is associated with an extension of application 114, the animated notification indicator may be displayed at or near an icon for the extension. The animated notification indicator may include animating the extension icon itself and/or displaying an animated indicator in association with the extension icon, examples of which are discussed in greater detail below with respect to FIGS. 5A-5J.

As noted above, any of a variety of actions may be performed in response to user interaction with the animated notification indicator. For example, notification manager 116 may display an associated notification in response to user actuation of the animated notification indicator. As another example, notification manager 116 may perform an action associated with the notification, such as opening an application or a website, among other examples. In some instances, notification manager 116 may generate a display comprising a set of quick actions or a preview of the associated notification when a hover, mouseover, or other similar user interaction is received in association with the indicator. In a further example, notification manager 116 may snooze or dismiss the notification in response to identifying an alternate actuation (e.g., a right click or a double tap) associated with the animated notification indicator.

Notification manager 116 may generate telemetry data for such user interactions, for example, indicating if the animated notification indicator is actuated, if the animated notification indicator is permitted to automatically revert to a static indicator (e.g., as a result of a timeout timer expiring), if a set of quick actions or preview is generated, or if the notification is dismissed or snoozed (e.g., as a result of an alternate actuation).

The telemetry data may be provided to trigger manager 112, which may thus be used to modify or delete an existing trigger and/or to generate a new trigger, among other examples. In some instances, a set of triggers may be tuned for a given user or group of users or for a given application, extension, service, or website. For example, a machine learning (ML) model may be trained, retrained, and/or fine-tuned based on such aggregated telemetry data, where a goal of the ML model is to increase the likelihood of user engagement with a notification and/or to reduce the likelihood of manual and/or automatic dismissal of a notification associated with a given trigger.

While example processing is described with respect to notification platform 102 and computing device 104, it will be appreciated that similar aspects may be distributed according to any of a variety of other paradigms or may be performed substantially locally or substantially remotely from computing device 104 in other examples. Further, it will be appreciated that any of a variety of other trigger processing and/or telemetry data processing techniques may be used in other examples.

Figure 2:
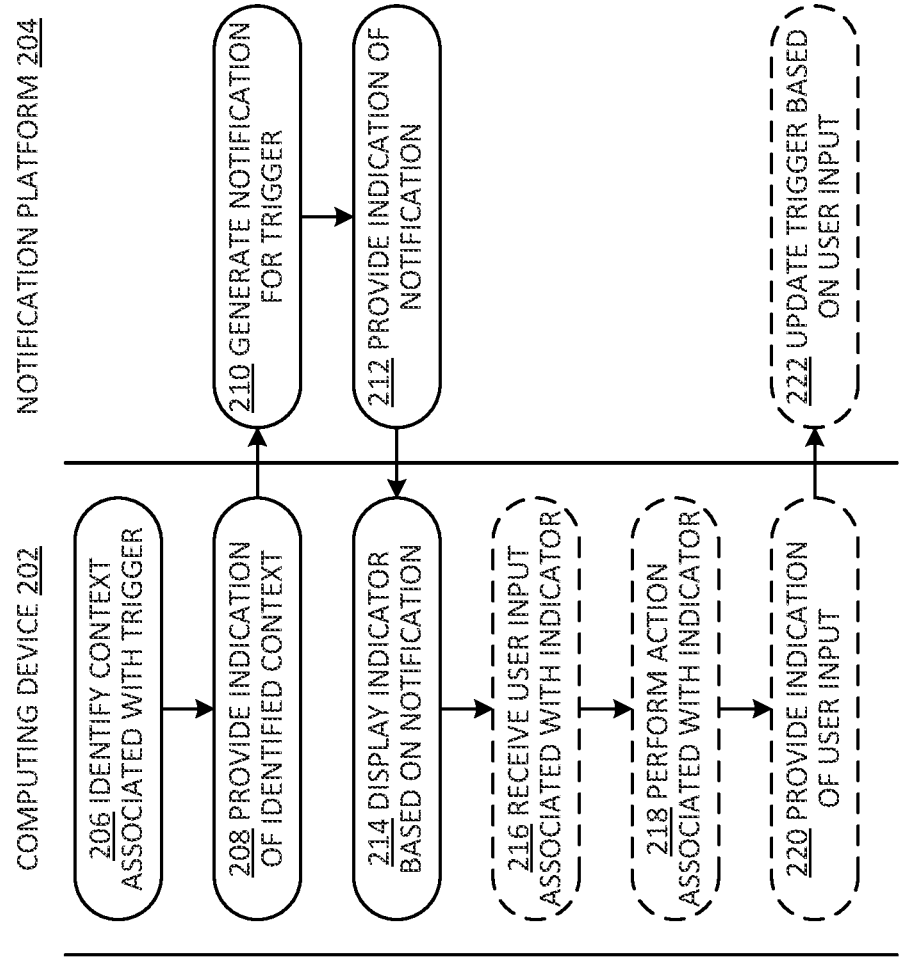
FIG. 2 illustrates an overview of an example process flow between a computing device and a notification platform according to aspects described herein.

FIG. 2 illustrates an overview of an example process flow 200 between computing device 202 and notification platform 204 according to aspects described herein. Aspects of computing device 202 and notification platform 204 are similar to those discussed above with respect to computing device 104 and notification platform 102, respectively, and are therefore not redescribed below in detail.

Flow 200 begins at operation 206, where a context associated with a trigger is identified. For example, the context may have been generated or otherwise managed by a context engine, such as context engine 118 in FIG. 1. Operation 206 may comprise evaluating a list of applications, extensions, services, or websites for which one or more triggers exist. As another example, operation 206 may comprise evaluating one or more regular expressions or other patterns associated with a set of triggers.

Thus, it will be appreciated that any of a variety of techniques may be used to determine that the current context is associated with one or more triggers. Operation 206 may be performed to reduce the amount of processing and/or associated traffic between computing device 202 and notification platform 204. Even so, in some examples, operation 206 may be omitted, as may be the case when most or all subsequent processing is performed locally to computing device 202 or when the context of computing device 202 is not expected to change at a high frequency, among other examples.

At operation 208, an indication of the identified context is provided to notification platform 204. For example, the indication may comprise at least a part of content that is presented to a user (e.g., via an application similar to application 114 in FIG. 1), an indication of a website and/or document (e.g., a URL or a file path), and/or a location for computing device 202, among other examples.

Accordingly, at operation 210, notification platform 204 generates a notification based on a trigger with which the context information is associated. As noted above, generating the notification may comprise evaluating a set of associated rules and/or performing entity extraction. While examples are described in which a single notification is generated for a single trigger, it will be appreciated that, in other examples, multiple triggers may be processed and that each trigger may generate one notification, multiple notifications, or no notifications. As noted above, each notification may have an associated priority level, which may be used for arbitration processing in instances where multiple notifications are received by computing device 202. Operation 210 may comprise generating the content of the notification which may include content from the context information what was received from computing device 202, content from notification platform 204, and/or content from any of a variety of other sources (not pictured).

At operation 212, notification platform 204 provides an indication of the notification accordingly. In examples, the indication comprises notification content and an indication of an application, extension, service, or website with which the notification is associated. Flow progresses to operation 214, where computing device 202 displays an animated notification indicator based on the notification that was received from notification platform 204. For example, operation 214 may comprise displaying an animated notification indicator in association with an application icon, extension icon, service icon, or other icon according to aspects described herein. Additional examples of such aspects are described below with respect to method 400 in FIG. 4.

Operations 216-222 are illustrated using dashed lines to indicate that, in some examples, they may not be performed (such that flow 200 terminates at operation 214, 218, or 222). For example, once the animated notification indicator is presented at operation 214, a user interaction associated with the indicator may not be received, such that the animated notification indicator may disappear or may be downgraded to a static indicator after the expiration of a timeout timer.

By contrast, if a user interaction is received, flow progresses to operation 216. Example user interactions include, but are not limited to, actuation of the animated notification indicator, as well as a hover or mouseover event, among other examples. It will be appreciated that a gesture or other user input may be identified as such a user interaction with the animated notification indicator, such as determining that the user is looking at the animated notification indicator via gaze detection. Accordingly, if a user interaction is identified, the timeout timer may be cancelled and a static indicator may be displayed instead or, as another example, the animated notification indicator may be dismissed (e.g., such that no indicator associated with the notification is retained).

At operation 218, an action is performed associated with the indicator. For example, if the user interaction comprises actuation of the animated notification indicator, the notification may be displayed and/or any of a variety of other associated actions may be performed. As another example, if the user interaction comprises a hover, mouseover, or other similar event, a set of quick actions or a preview may be displayed. As a further example, if the user interaction comprises an alternate actuation, the animated notification indicator may be snoozed for display at a later time/date and/or similar notifications may be snoozed for a predetermined amount of time. In other instances, the animated notification indicator may be dismissed in response to receipt of such an alternate actuation.

Flow may progress to operation 220, where an indication of the user interaction is provided (e.g., as telemetry data to a trigger manager, such as trigger manager 112 in FIG. 1). Accordingly, notification platform 204 may update an associated trigger based on the telemetry data at operation 222, where flow 200 terminates.

Figure 3:
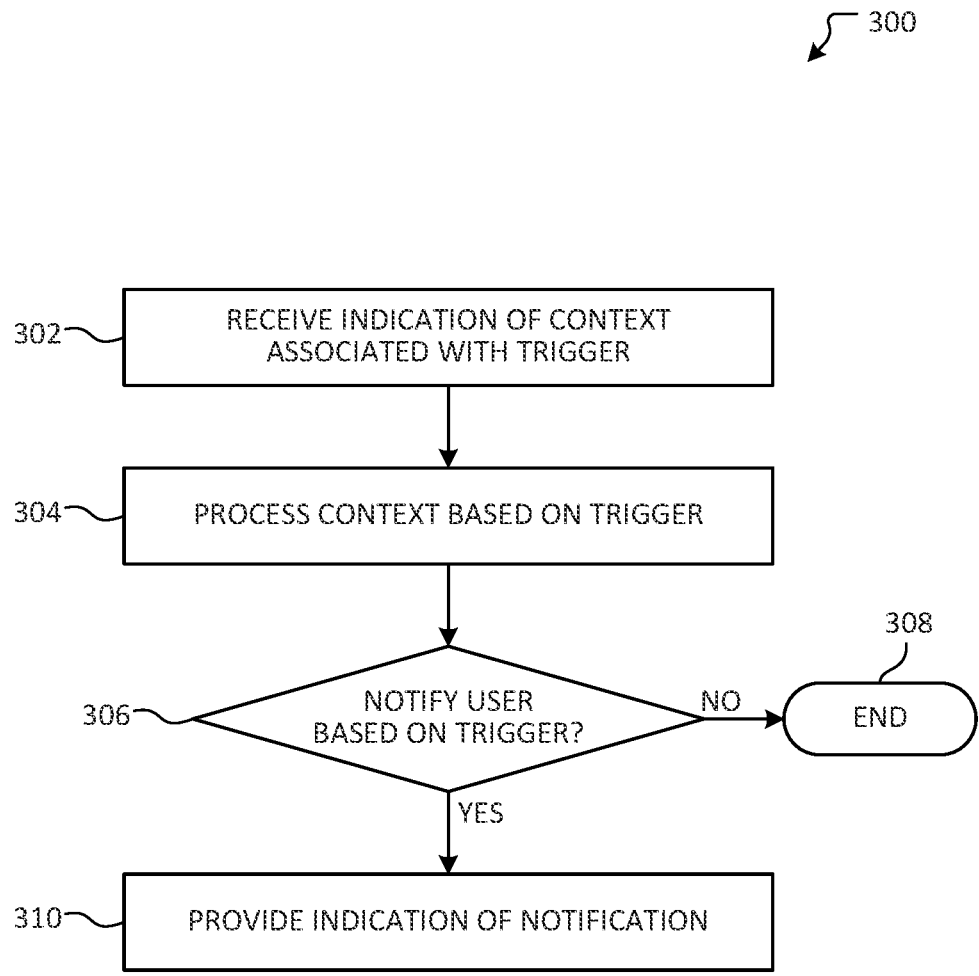
FIG. 3 illustrates an overview of an example method for generating a notification for a context based on a trigger.

FIG. 3 illustrates an overview of an example method 300 for generating a notification for a context based on a trigger. In examples, aspects of method 300 are performed by a notification platform, such as notification platform 102 or 204 in FIGS. 1 and 2, respectively.

Method 300 begins at operation 302, where an indication of a context associated with a trigger is received. For example, the indication may be received from a notification manager (e.g., notification manager 116 in FIG. 1) based on a context generated by a context engine (e.g., context engine 118).

Accordingly, at operation 304, the context is processed based on an associated trigger. In examples, operation 304 comprises identifying a trigger with which to process the context indication, as may be determined by a URL, a file path, and/or another indication of an application, extension, service, or website with which the context is associated. In examples, the trigger is identified from a set of triggers associated with the user, a group of users, and/or a region, among other examples. As noted above, processing the context may comprise evaluating a set of rules associated with the trigger and/or performing entity extraction, among other examples. Operation 304 may comprise generating content for the notification according to aspects described herein.

At determination 306, it is determined whether to notify the user based on the trigger. For example, the set of rules evaluated at operation 304 may comprise a determination as to whether the notification is relevant (e.g., above a predetermined threshold) to content indicated by the context information. As another example, determination 306 may comprise determining whether a similar notification (e.g., associated with similar content and/or a similar application, extension, service, or website) has been provided to the computing device within a predetermined time range or whether notifications have been snoozed. Thus, it will be appreciated that any of a variety of determinations may be made at determination 306. If it is determined not to notify the user based on the trigger, flow branches "NO" and ends at operation 308.

By contrast, if it is instead determined to notify the user, method 300 branches "YES" to operation 310, where an indication of the notification is provided. For example, the indication may comprise notification content that was generated at operation 304, an associated priority, and/or an indication of an application, extension, service, or website with which the notification is associated. The indication may be provided in response to the context indication that was received at operation 302 or may be provided using any of a variety of other mechanisms (e.g., as a push notification). Method 300 terminates at operation 310.

Figure 4:
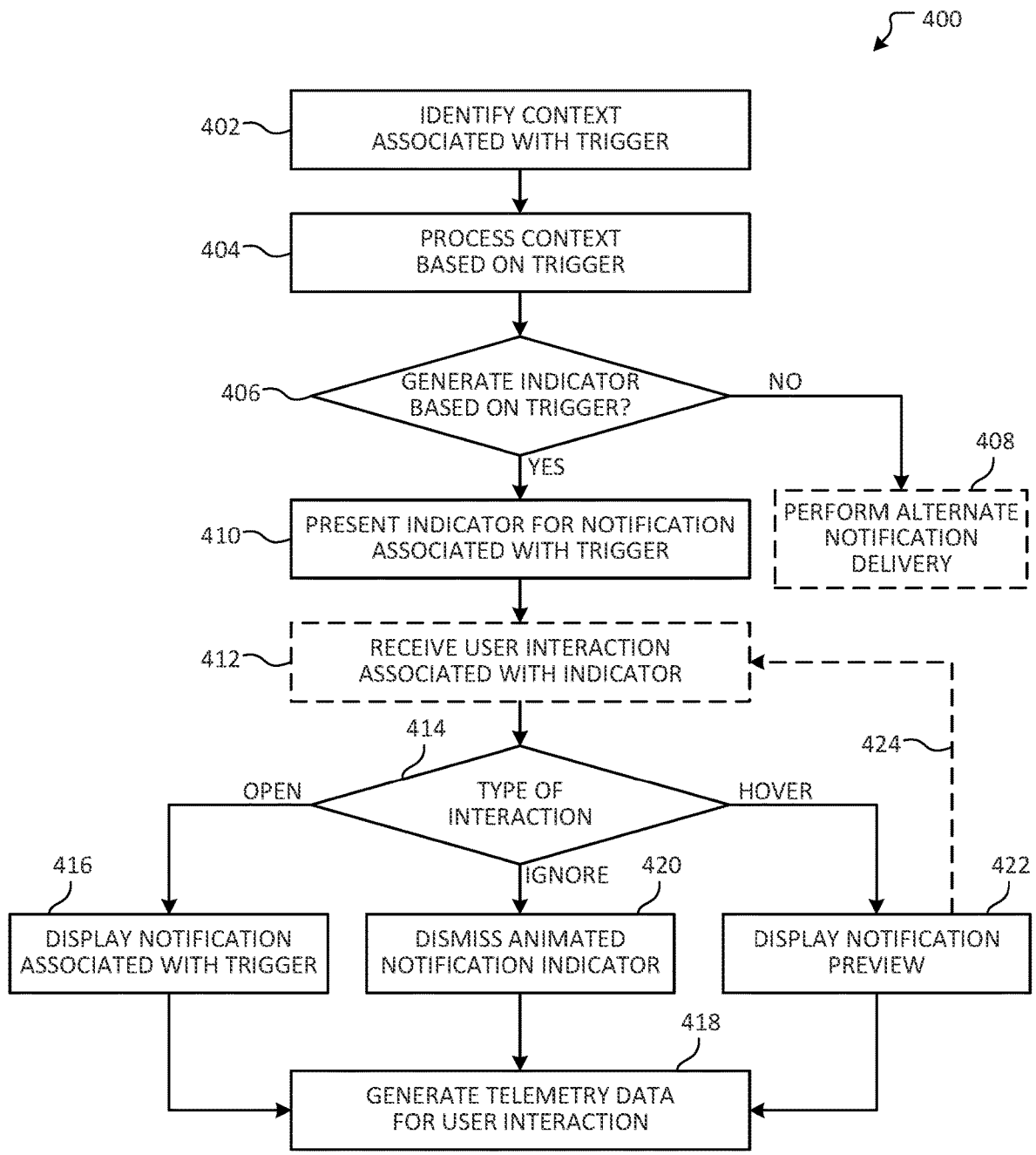
FIG. 4 illustrates an overview of an example method for presenting an animated notification indicator according to aspects described herein.

FIG. 4 illustrates an overview of an example method 400 for presenting an animated notification indicator according to aspects described herein. In examples, aspects of method 400 are performed by a computing device, such as computing device 104 or computing device 202 in FIGS. 1 and 2, respectively.

Method 400 begins at operation 402, where a context associated with a trigger is identified. For example, the context may have been generated or otherwise managed by a context engine, such as context engine 118 in FIG. 1. Operation 402 may comprise evaluating a list of applications, services, or websites for which one or more triggers exist. As another example, operation 402 may comprise evaluating one or more regular expressions or other patterns associated with a set of triggers. It will thus be appreciated that any of a variety of techniques may be used to determine whether a trigger exists for a given context.

At operation 404, the context is processed based on the trigger. In examples, operation 404 comprises providing a context indication to a notification platform (e.g., notification platform 102 or notification platform 204 in FIGS. 1 and 2, respectively), such that the notification platform may process the context indication according to aspects discussed above with respect to method 300 in FIG. 3. In other examples, similar processing may be performed local to the computing device, such that operation 404 comprises performing aspects similar to those discussed above with respect to method 300. Such aspects are therefore not redescribed in detail.

Method 400 progresses to determination 406, where a determination is made whether to generate an animated notification indicator based on the trigger. In examples, determination 406 comprises evaluating historical notification activity at the computing device. For example, if the number of previous notifications within a predetermined time period exceeds a predetermined threshold, it may be determined not to notify the user. The determination may be performed with respect to previous notifications for the same or a similar set of applications, extensions, or services, among other examples. In another example, determination 406 may comprise evaluating a priority level associated with the notification (e.g., as part of an arbitration process), as may be the case when multiple notifications are contemporaneously being evaluated for display according to aspects described herein. Thus, similar aspects may be used for processing a single notification or a set of multiple notifications in other examples.

As a further example, determination 406 may comprise evaluating an amount of time that elapsed between operation 402 and 404 and/or whether the context at the computing device has changed, as the notification may no longer be contextually and/or temporally relevant to the user's current task at hand. In another example, the determination may comprise determining whether such notifications and/or associated animated notification indicators have been snoozed. Thus, it will be appreciated that any of a variety of determinations may be made at determination 406.

If it is determined not to generate an animated notification indicator, flow branches "NO" to operation 408, where alternate notification delivery may be performed. For example, a static indicator may be used to indicate the notification or, as another example, the notification may be silently added (e.g., without any associated indicator) to a notification tray or notification center, among other examples. Operation 408 is illustrated using a dashed box to indicate that, in other examples, no further action may be taken for a notification when it is determined not to generate an animated notification indicator. Method 400 terminates at operation 408.

By contrast, if it is instead determined to notify the user, flow branches "YES" to operation 410, where an animated notification indicator is presented to the user. For example, the animated notification indicator may be displayed in association with an application icon, extension icon, service icon, website icon, or other icon for which it was generated (e.g., as may have been determined based on the trigger with which the context was processed). Additional examples of such aspects are discussed below with respect to FIGS. 5A-5J.

Flow may progress to operation 412, where user interaction associated with the animated notification indicator is received. As discussed above, the user may mouseover, actuate, or otherwise interact with the animated notification indicator. In other examples, no user interaction may be received specifically in association with the indicator, such that method 400 continues from operation 410 to determination 414.

At determination 414, a type of interaction is determined. In instances where the user actuated the notification, method 400 branches "OPEN" to operation 416, where an action associated with the notification is performed. For example, operation 416 may comprise displaying the notification for which the animated notification indicator was generated. As another example, operation 416 may comprise opening an application associated with the notification, opening a side pane associated with an extension for which the notification was generated, and/or opening a website associated with the notification, among other examples. In some instances, the action that is performed at operation 416 may be user-configurable.

Flow progresses to operation 418, where telemetry data is generated based on the user interaction, which may be provided to a notification platform as described above, thereby enabling triggers with which context information is processed to be added, updated, and/or removed, among other examples. Method 400 terminates at operation 418.

Returning to determination 414, if the user interaction is instead hovering over (or, in other examples, near) the animated notification indicator, flow branches "HOVER" to operation 422, where a preview and/or set of quick actions is displayed. As noted above, such a user interaction may be identified after a predetermined amount of time has elapsed (e.g., after the user has hovered over or gazed at the indicator for a certain number of seconds). Dashed arrow 424 is illustrated from operation 422 to operation 412, as a subsequent user interaction may be received after the preview and/or set of quick actions is displayed. For example, the user may actuate the indicator, the preview, or the set of quick actions, such that flow returns to determination 414 and branches to operation 416 as discussed above. As another example, the user may instead ignore the preview (e.g., as may be determined after a period of inactivity has elapsed in which subsequent user input associated with the indicator, the preview, and/or the set of quick actions is not received), such that flow branches "IGNORE" from determination 414 to operation 420, which is discussed below. Method 400 eventually progresses to operation 418 as discussed above, after which method 400 terminates.

Returning again to determination 414, if the user interaction instead indicates no user interaction with the animated notification indicator (e.g., such that the timeout timer expires), flow branches "IGNORE" to operation 420, where the animated notification indicator is dismissed. Any of a variety of operations may be performed to dismiss the animated notification indicator, including, but not limited to, transitioning to a static indicator and/or adding the notification to a notification tray or notification center. It will be appreciated that method 400 is illustrated as including several example user interactions and, in other examples, any of a variety of additional or alternative interactions may be used, such as actively dismissing the indicator in response to receiving user interaction including an alternate actuation as discussed above. Method 400 then progresses to operation 418 as discussed above, after which method 400 terminates.

Figure 5A:
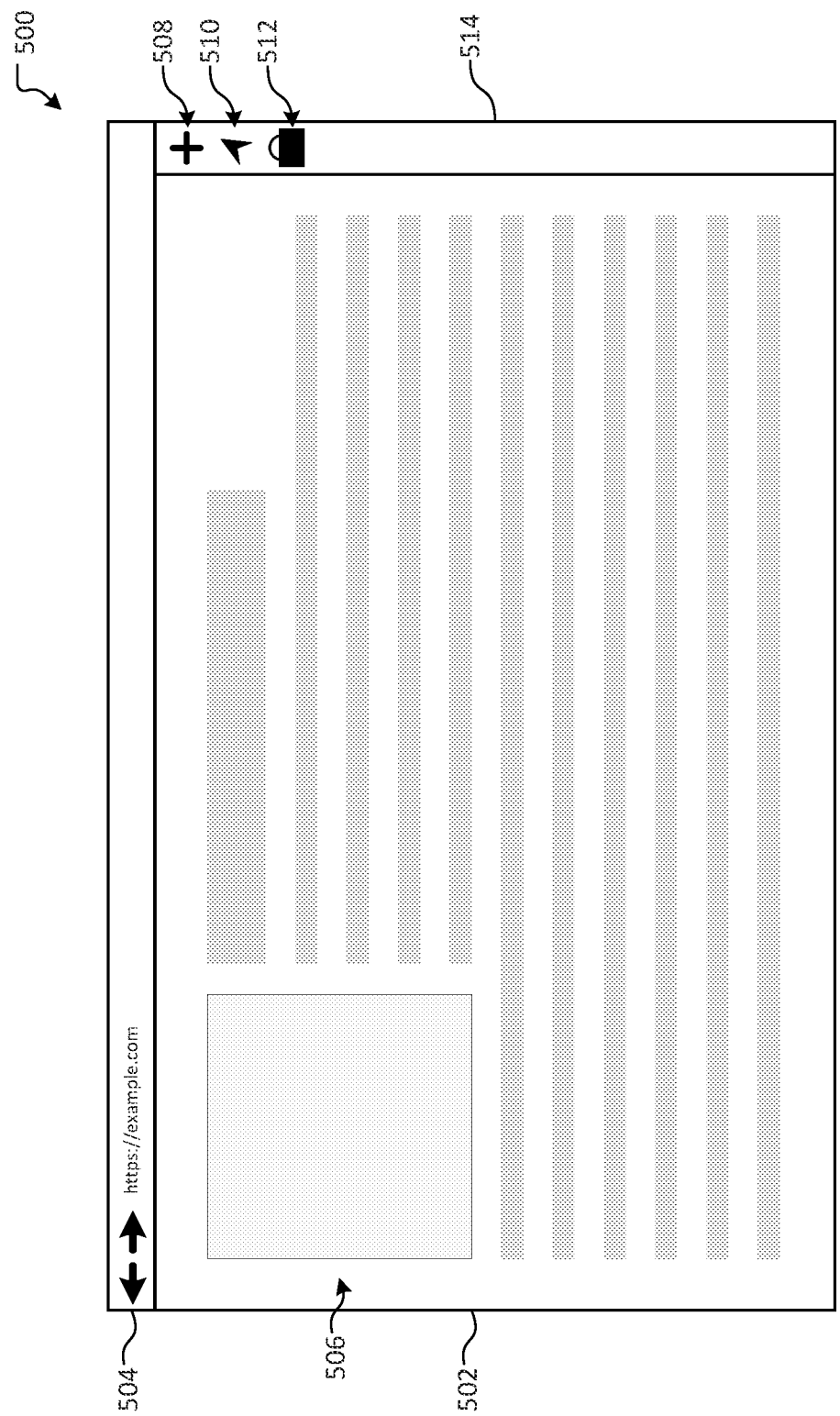

FIGS. 5A-5D illustrate overviews of example user interface aspects with which an animated notification indicator may be presented to a user according to aspects described herein. As illustrated in FIG. 5A, UI 500 is provided as an example UI for an application (e.g., application 114 in FIG. 1). More specifically, UI 500 illustrates an example web browser application in which content 506 is displayed in document pane 502 (e.g., a viewport of the web browser application), which is associated with "http://example.com" as indicated in control bar 504. UI 500 further comprises sidebar 514, in which extension icons 508, 510, and 512 are present. In examples, the extensions in sidebar 514 are user-configurable, such that the user may add, remove, and/or rearrange extension icons 508, 510, and 512, among other examples.

It will be appreciated that UI 500 and the associated UI elements of the browser frame (e.g., control bar 504, document pane 502, and sidebar 514) are provided in an example configuration and, in other examples, any of a variety of other configurations and constituent UI elements may be used. For example, UI 500 may be associated with any of a variety of other applications.

Figure 5B:
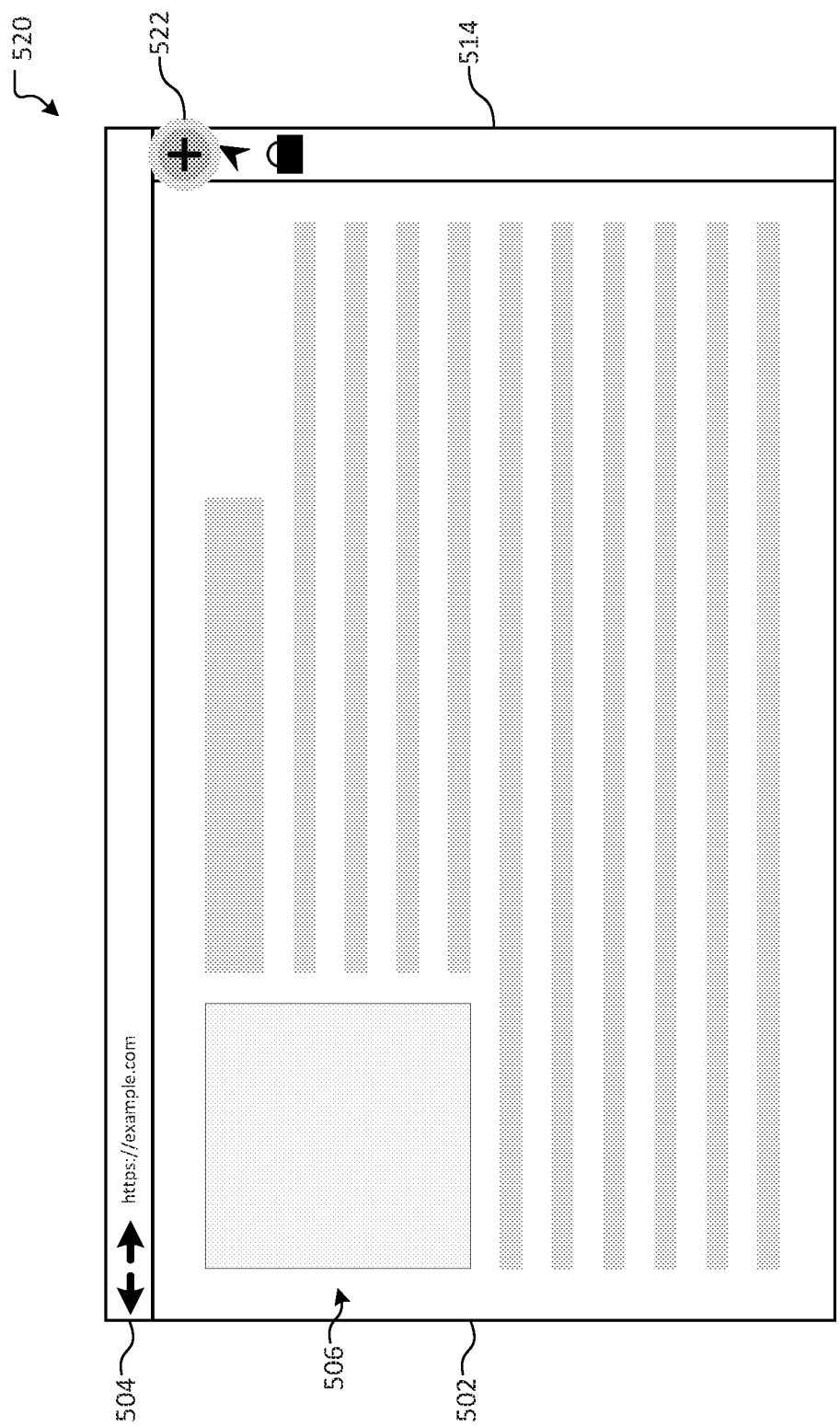

With reference now to FIG. 5B, UI 520 is provided as an example in which animated notification indicator 522 is presented. As illustrated, animated notification indicator 522 is presented in association with extension icon 508, as the notification may have been determined to be generated for a trigger associated with an extension corresponding to extension icon 508 according to aspects described herein. Additional aspects associated with the animation of animated notification indicator 522 are discussed below with respect to FIGS. 5E-5J.

Figure 5C:
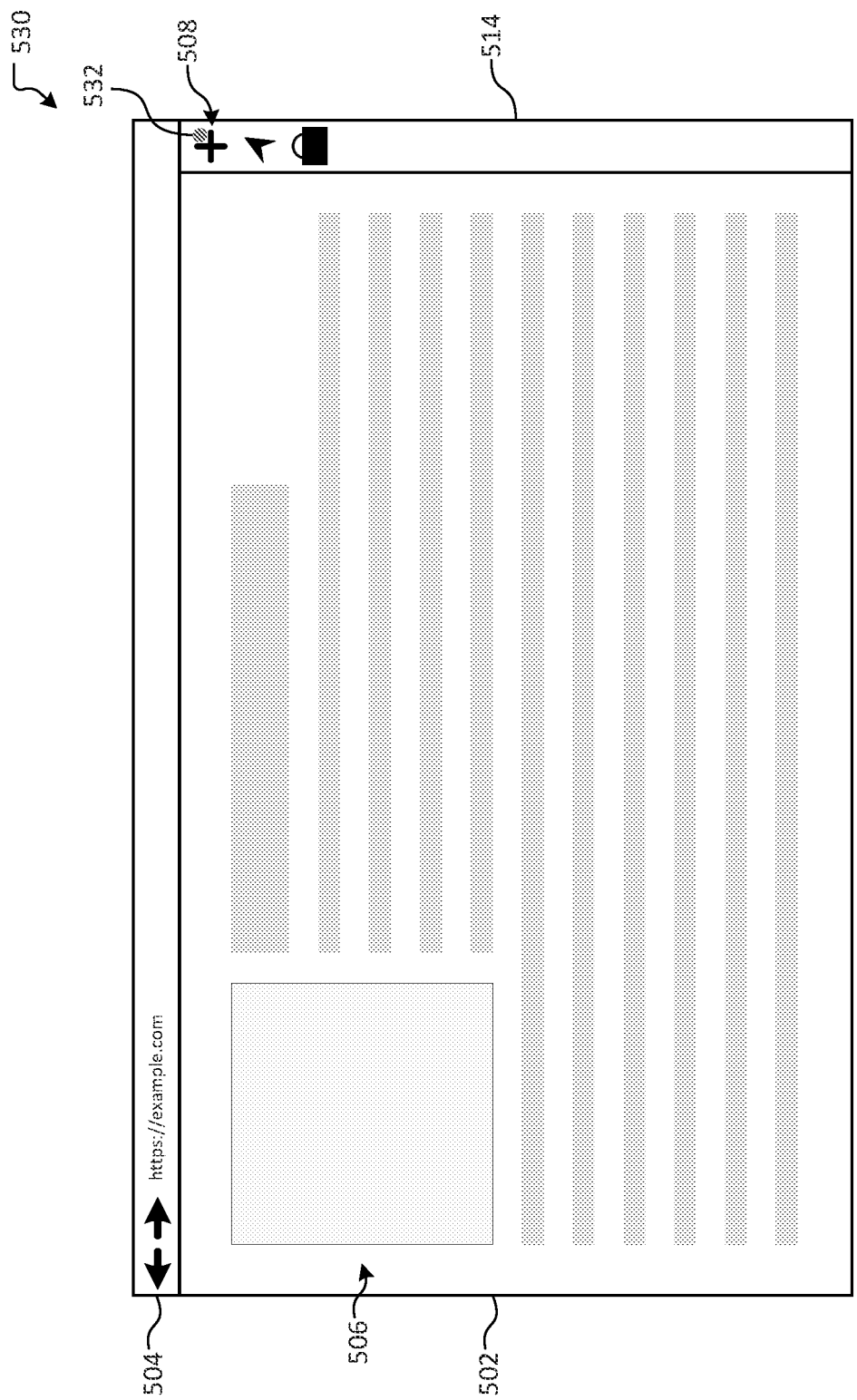

Turning to FIG. 5C, view 530 provides an example in which a timeout timer for animated notification indicator 522 has expired, such that animated notification indicator 522 has been downgraded or has otherwise transitioned to static indicator 532. Static indicator 532 is illustrated as a dot that is displayed in association with extension icon 508, though it will be appreciated that any of a variety of other indicators may be used in other examples (e.g., a numeric value associated with a number of notifications associated with the extension and/or a line under extension icon 508).

With reference now to FIG. 5D, view 540 provides an alternate example to that of Figure in which cursor 542 hovers over animated notification indicator 522, such that notification preview 544 is generated and presented accordingly. As illustrated, notification preview 544 includes graphical content 548 and textual content 546 (which together may be referred to as "preview content"). It will be appreciated that any of a variety of additional or alternative preview content (e.g., including text, images, videos, and/or associated audio) may form a notification preview in other examples. Similar techniques may be used to present a set of quick actions, such that notification preview 544 alternatively or additionally includes one or more quick action UI controls that, when actuated, cause one or more associated actions to be performed. While view 540 is provided as an example in which a user interaction is received using cursor 542, it will be appreciated that such user interactions may be received using any of a variety of other inputs (e.g., touch, keyboard, and/or mechanical input).

FIGS. 5E-5J illustrate overviews of an example animation for an animated notification indicator according to aspects described herein (e.g., as may be applied to animated notification indicator 522 discussed above with respect to FIGS. 5A-5D). As illustrated, the animated notification indicator transitions through the various representations illustrated by FIGS. 5E, 5F, 5H, and 5I, in which circle 550 grows in size (e.g., as illustrated by circles 554, 558, and 562), appearing to radiate outward from a point beneath extension icon 552. A new, smaller circle 564 is introduced in FIG. 5H on top of the initial circle (circle 562 in FIG. 5H), after which, in FIG. 5I, circle 564 grows in size to circle 570, and circle 550 ultimately fades away or disappears (indicated by dashed circle 568).

As such, in a subsequent iteration of FIGS. 5F, 5G, 5H, and 5I, circle 564 may grow in size and ultimately disappear (similar to the above-described aspects with respect to circle 550). FIGS. 5E-5I further illustrate that, as a circle grows in size (e.g., as illustrated by circles 550, 554, 558, 562, and 568), the color and/or opacity of the circle lightens or decreases, respectively, and ultimately disappears. Circle 564 follows a similar pattern, thus providing a "ping" animation, in which a graphical representation of a signal radiates outward until a subsequent signal begins to radiate, at which point the graphical representation of the initial signal disappears.

FIGS. 5E-5I further illustrate an example animation of extension icon 508 itself, where an initial representation 552 is rotated counterclockwise (representation 556), rotated clockwise back to its initial orientation (representation 560), rotated further clockwise (representation 566), and rotated counterclockwise back to its initial orientation (representation 572). Thus, extension icon 508 may also be animated to further capture the user's attention. It will be appreciated that the animation of extension icon 508 illustrated by FIGS. 5E-5I is provided as an example and, in other examples, any of a variety of additional or alternative animation techniques may be used, such as varying the size and/or color of the icon. Similarly, while the illustrated ping animation is illustrated in an example where a circle radiates outward, it will be appreciated that any of a variety of shapes and/or other animations may be used. For example, the shape may instead mirror that of the icon for which the animation is being generated.

Eventually, the animation may progress from FIG. 5I to FIG. 5J rather than to Figure as may be the case when a timeout timer has expired. Thus, FIG. 5J illustrates an example in which animated notification indicator 522 has been downgraded or has otherwise transitioned to a static indicator and thus comprises extension icon 508 in association with static indicator 576. Aspects of static indicator 576 are similar to those of static indicator 532 discussed above with respect to FIG. 5C and are therefore not redescribed in detail.

While an example animation and associated progression is illustrated and described herein, it will be appreciated that any of a variety of other such aspects may be used in other examples according to aspects of the present disclosure. For example, an animated notification indicator need not transition to a static indicator as a result of progressing from FIGS. 5I to 5J and may instead transition from any of a variety of other states (e.g., as illustrated by one of FIG. 5E, 5F, 5G or 5H).

Figure 6:
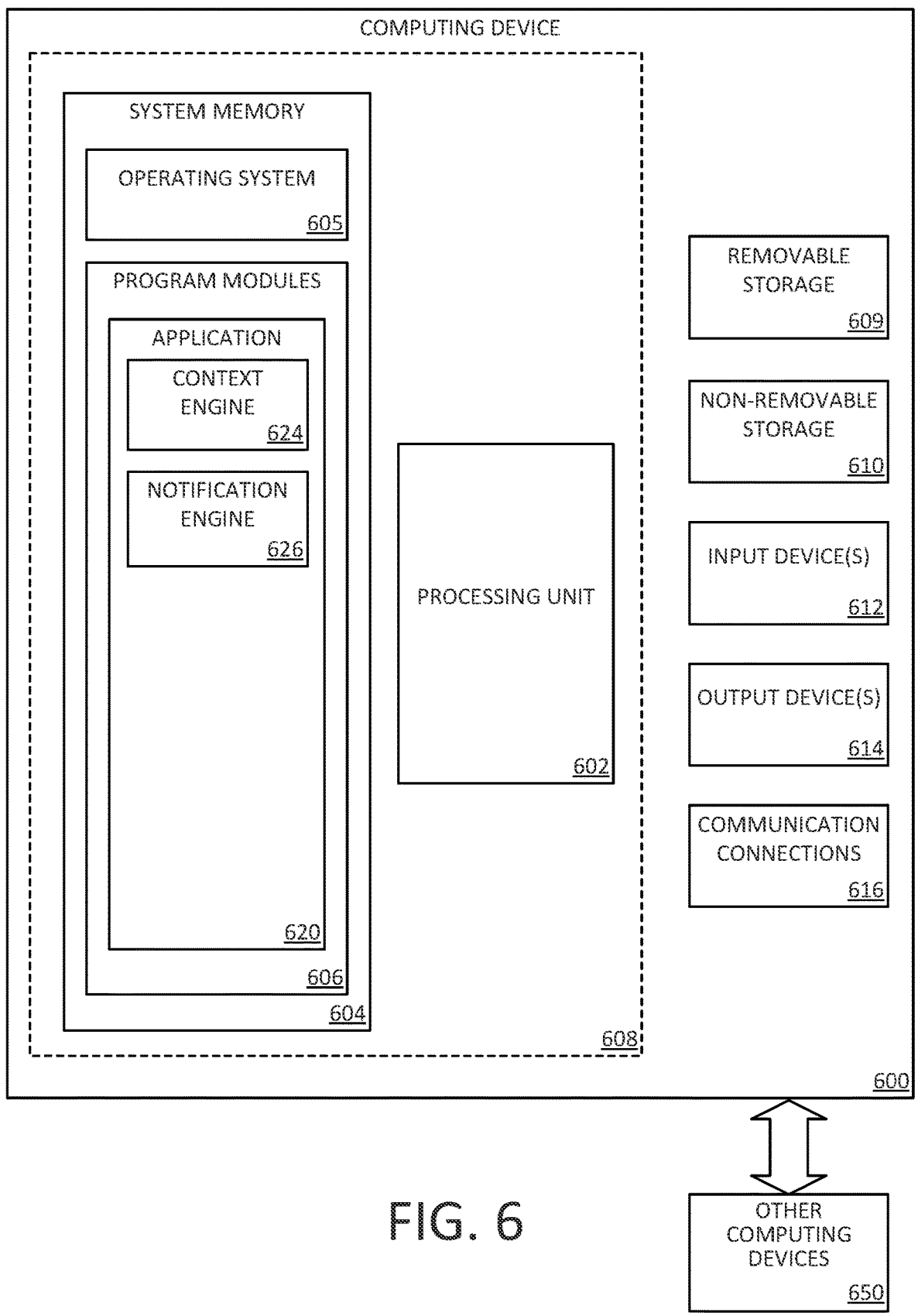
FIG. 6 is a block diagram illustrating example physical components of a computing device with which aspects of the disclosure may be practiced.
Figure 7A:
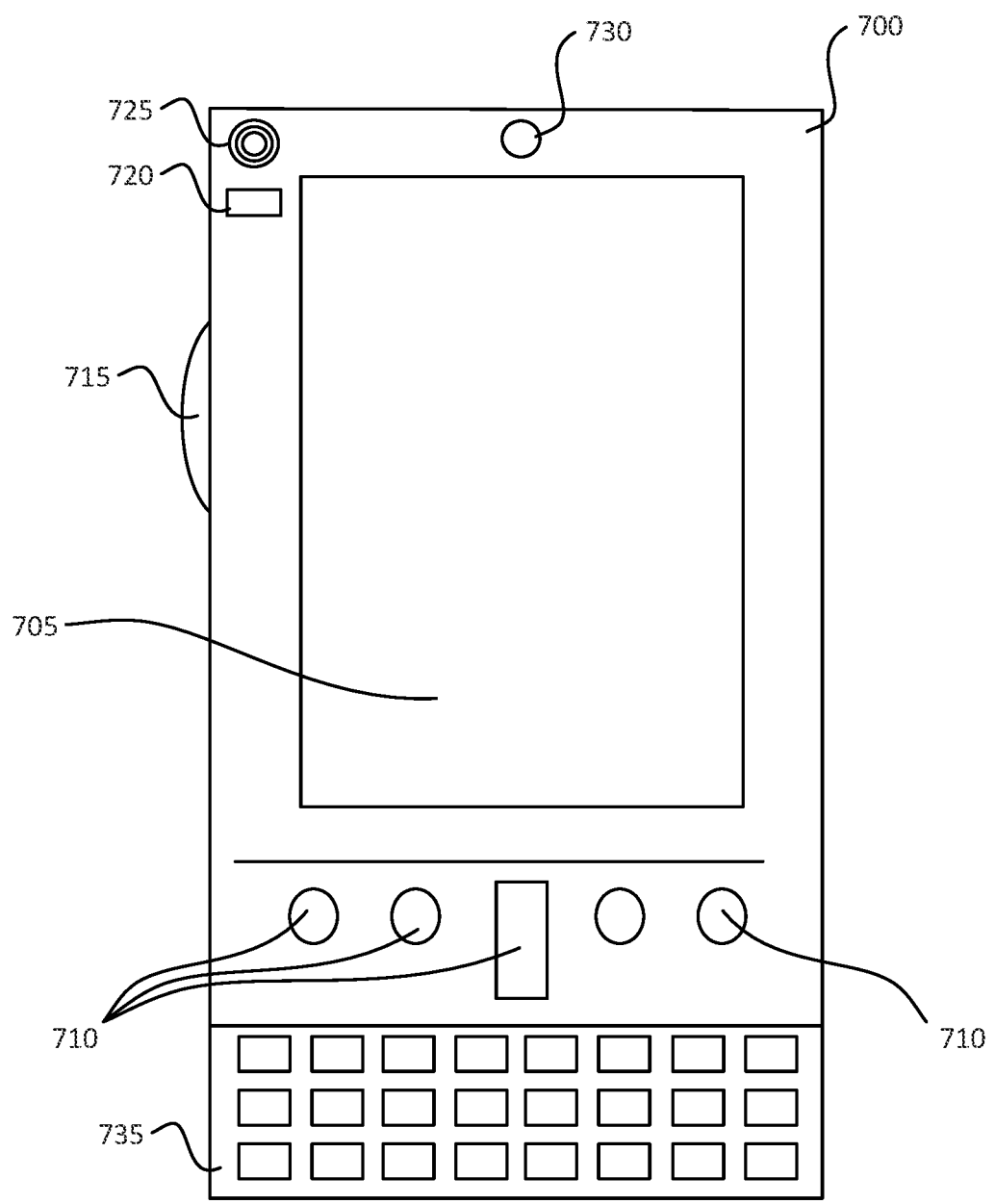
FIGS. 7A and 7B are simplified block diagrams of a mobile computing device with which aspects of the present disclosure may be practiced.
Figure 7B:
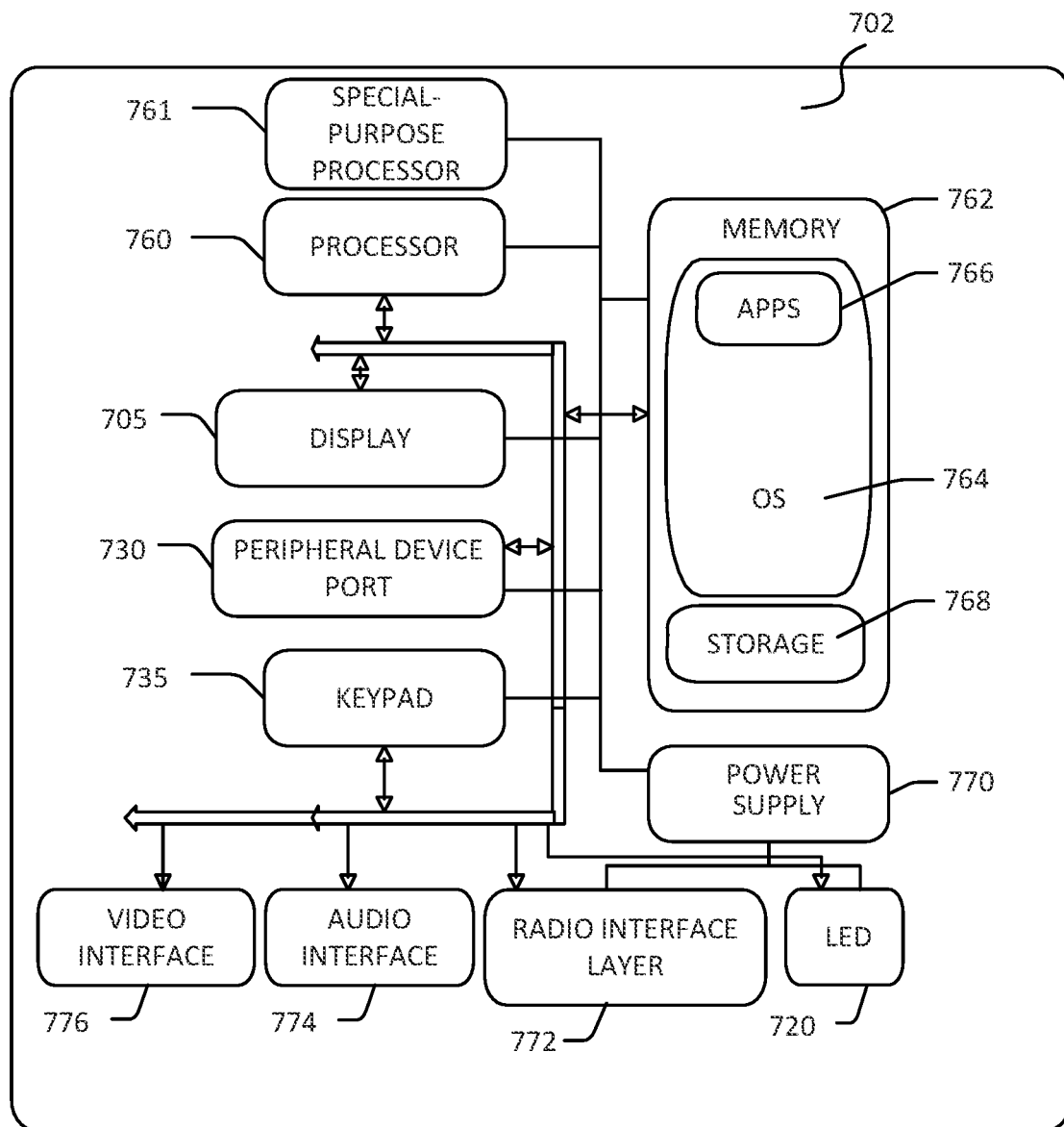
Figure 8:
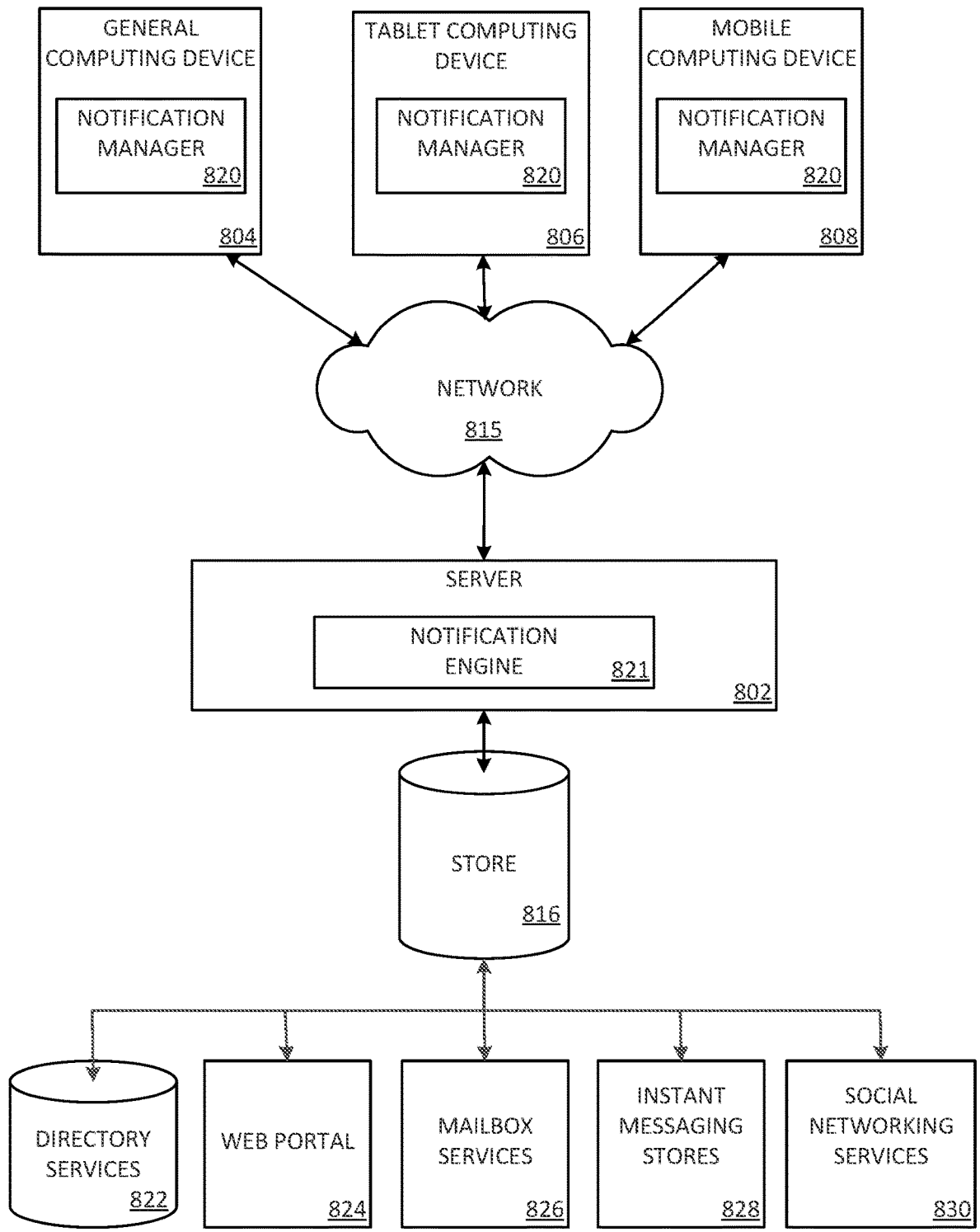
FIG. 8 is a simplified block diagram of a distributed computing system in which aspects of the present disclosure may be practiced.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of computing device configurations that may be utilized for practicing aspects of the disclosure, described herein.

FIG. 6 is a block diagram illustrating physical components (e.g., hardware) of a computing device 600 with which aspects of the disclosure may be practiced. The computing device components described below may be suitable for the computing devices described above, including devices 102 and 104 in FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store context engine 624 and notification engine 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., a sustainability manager, a software telemetry engine, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A notification manager 820 may be employed by a client that communicates with server device 802, and/or notification engine 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

In other examples, a tablet computing device may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving, from a notification platform, an indication of a notification; displaying an animated notification indicator for the notification in association with a user interface element for which the notification was generated; receiving a user interaction associated with the animated notification indicator; and in response to the user interaction, displaying the notification in association with the user interface element. In an example, receiving the indication of the notification comprises: evaluating a context of the system based on trigger information associated with the notification platform; based on determining the context is associated with a trigger of the trigger information, providing an indication of the context to the notification platform; and receiving, from the notification platform, an indication of the notification for a user of the system. In another example, the user interaction is a first user interaction and the set of operations further comprises: receiving, before the first user interaction, a second user interaction associated with the animated notification indicator; and in response to the second user interaction, displaying a notification preview for the notification. In a further example, the animated notification indicator comprises an animated shape associated with the user interface element that grows in size and changes in at least one of color or opacity. In yet another example, the animated shape is a first animated shape; the animated notification indicator further comprises a second animated shape that grows in size and is smaller in size that the first animated shape; and the animated shape of the animated notification indicator disappears after reaching a predetermined size. In a further still example, the animated notification indicator further comprises animating the associated user interface element. In another example, the animated notification indicator is displayed in a frame of a web browser application based on content of a viewport of the web browser application.

In another aspect, the technology relates to a method. The method comprises: receiving, from a notification platform, an indication of a notification based on context of a computing device; displaying an animated notification indicator for the notification in association with a user interface element for which the notification was generated, wherein the animated notification indicator is displayed in a frame on an application of the computing device separate from content of a viewport of the application; and updating the displayed animated notification indicator in response to at least one of receiving user input or expiration of a timeout timer for the animated notification indicator. In an example, the method further comprises identifying user actuation of the animated notification indicator; and updating the displayed animated notification indicator comprises: stopping animation of the animated notification indicator; and displaying the notification in association with the user interface element. In another example, the method further comprises identifying a hovering event associated with the animated notification indicator; and updating the displayed animated notification indicator comprises: stopping animation of the animated notification indicator; and displaying a notification preview for the notification. In a further example, user interaction associated with the animated notification indicator is not received before expiration of the timeout timer; and updating the displayed animated notification indicator comprises transitioning the animated notification indicator to a static indicator. In yet another example, the animated notification indicator comprises an animated shape associated with the user interface element that grows in size and changes in at least one of color or opacity. In a further still example, the animated notification indicator further comprises animating the associated user interface element.

In a further aspect, the technology relates to another method. The method comprises: receiving, from a notification platform, an indication of a notification; displaying an animated notification indicator for the notification in association with a user interface element for which the notification was generated; receiving a user interaction associated with the animated notification indicator; and in response to the user interaction, displaying the notification in association with the user interface element. In an example, receiving the indication of the notification comprises: evaluating a context of a computing device based on trigger information associated with the notification platform; based on determining the context is associated with a trigger of the trigger information, providing an indication of the context to the notification platform; and receiving, from the notification platform, an indication of the notification for a user of the computing device. In another example, the user interaction is a first user interaction and the method further comprises: receiving, before the first user interaction, a second user interaction associated with the animated notification indicator; and in response to the second user interaction, displaying a notification preview for the notification. In a further example, the animated notification indicator comprises an animated shape associated with the user interface element that grows in size and changes in at least one of color or opacity. In yet another example, the animated shape is a first animated shape; the animated notification indicator further comprises a second animated shape that grows in size and is smaller in size that the first animated shape; and the animated shape of the animated notification indicator disappears after reaching a predetermined size. In a further still example, the animated notification indicator further comprises animating the associated user interface element. In another example, the animated notification indicator is displayed in a frame of a web browser application based on content of a viewport of the web browser application.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
      receiving, from a notification platform, an indication of a notification;
      displaying an animated notification indicator for the notification in association with a user interface element for which the notification was generated;
      receiving a user interaction associated with the animated notification indicator; and
      in response to the user interaction, displaying the notification in association with the user interface element.

2. The system of claim 1, wherein receiving the indication of the notification comprises:
   evaluating a context of the system based on trigger information associated with the notification platform;
   based on determining the context is associated with a trigger of the trigger information, providing an indication of the context to the notification platform; and
   receiving, from the notification platform, an indication of the notification for a user of the system.

3. The system of claim 1, wherein the user interaction is a first user interaction and the set of operations further comprises:
   receiving, before the first user interaction, a second user interaction associated with the animated notification indicator; and
   in response to the second user interaction, displaying a notification preview for the notification.

4. The system of claim 1, wherein the animated notification indicator comprises an animated shape associated with the user interface element that grows in size and changes in at least one of color or opacity.

5. The system of claim 4, wherein:
   the animated shape is a first animated shape;
   the animated notification indicator further comprises a second animated shape that grows in size and is smaller in size that the first animated shape; and
   the animated shape of the animated notification indicator disappears after reaching a predetermined size.

6. The system of claim 1, wherein the animated notification indicator further comprises animating the associated user interface element.

7. The system of claim 1, wherein the animated notification indicator is displayed in a frame of a web browser application based on content of a viewport of the web browser application.

8. A method, comprising:
   receiving, from a notification platform, an indication of a notification based on context of a computing device;
   displaying an animated notification indicator for the notification in association with a user interface element for which the notification was generated, wherein the animated notification indicator is displayed in a frame on an application of the computing device separate from content of a viewport of the application; and
   updating the displayed animated notification indicator in response to at least one of receiving user input or expiration of a timeout timer for the animated notification indicator.

9. The method of claim 8, wherein:
   the method further comprises identifying user actuation of the animated notification indicator; and
   updating the displayed animated notification indicator comprises:
      stopping animation of the animated notification indicator; and
      displaying the notification in association with the user interface element.

10. The method of claim 8, wherein:
    the method further comprises identifying a hovering event associated with the animated notification indicator; and
    updating the displayed animated notification indicator comprises:
       stopping animation of the animated notification indicator; and
       displaying a notification preview for the notification.

11. The method of claim 8, wherein:
    user interaction associated with the animated notification indicator is not received before expiration of the timeout timer; and
    updating the displayed animated notification indicator comprises transitioning the animated notification indicator to a static indicator.

12. The method of claim 8, wherein the animated notification indicator comprises an animated shape associated with the user interface element that grows in size and changes in at least one of color or opacity.

13. The method of claim 8, wherein the animated notification indicator further comprises animating the associated user interface element.

14. A method, comprising:
    receiving, from a notification platform, an indication of a notification;
    displaying an animated notification indicator for the notification in association with a user interface element for which the notification was generated;
    receiving a user interaction associated with the animated notification indicator; and
    in response to the user interaction, displaying the notification in association with the user interface element.

15. The method of claim 14, wherein receiving the indication of the notification comprises:
    evaluating a context of a computing device based on trigger information associated with the notification platform;

based on determining the context is associated with a trigger of the trigger information, providing an indication of the context to the notification platform; and receiving, from the notification platform, an indication of the notification for a user of the computing device.

16. The method of claim 14, wherein the user interaction is a first user interaction and the method further comprises:

receiving, before the first user interaction, a second user interaction associated with the animated notification indicator; and in response to the second user interaction, displaying a notification preview for the notification.

17. The method of claim 14, wherein the animated notification indicator comprises an animated shape associated with the user interface element that grows in size and changes in at least one of color or opacity.

18. The method of claim 17, wherein:

the animated shape is a first animated shape;

the animated notification indicator further comprises a second animated shape that grows in size and is smaller in size that the first animated shape; and the animated shape of the animated notification indicator disappears after reaching a predetermined size.

19. The method of claim 14, wherein the animated notification indicator further comprises animating the associated user interface element.

20. The method of claim 14, wherein the animated notification indicator is displayed in a frame of a web browser application based on content of a viewport of the web browser application.

* * * * *